April 14, 1942.                G. SLAYTER                 2,279,583
            CHEMICAL SYNTHESIS WITH ELECTRIC PRECIPITATION
                    Filed April 6, 1939         2 Sheets-Sheet 2
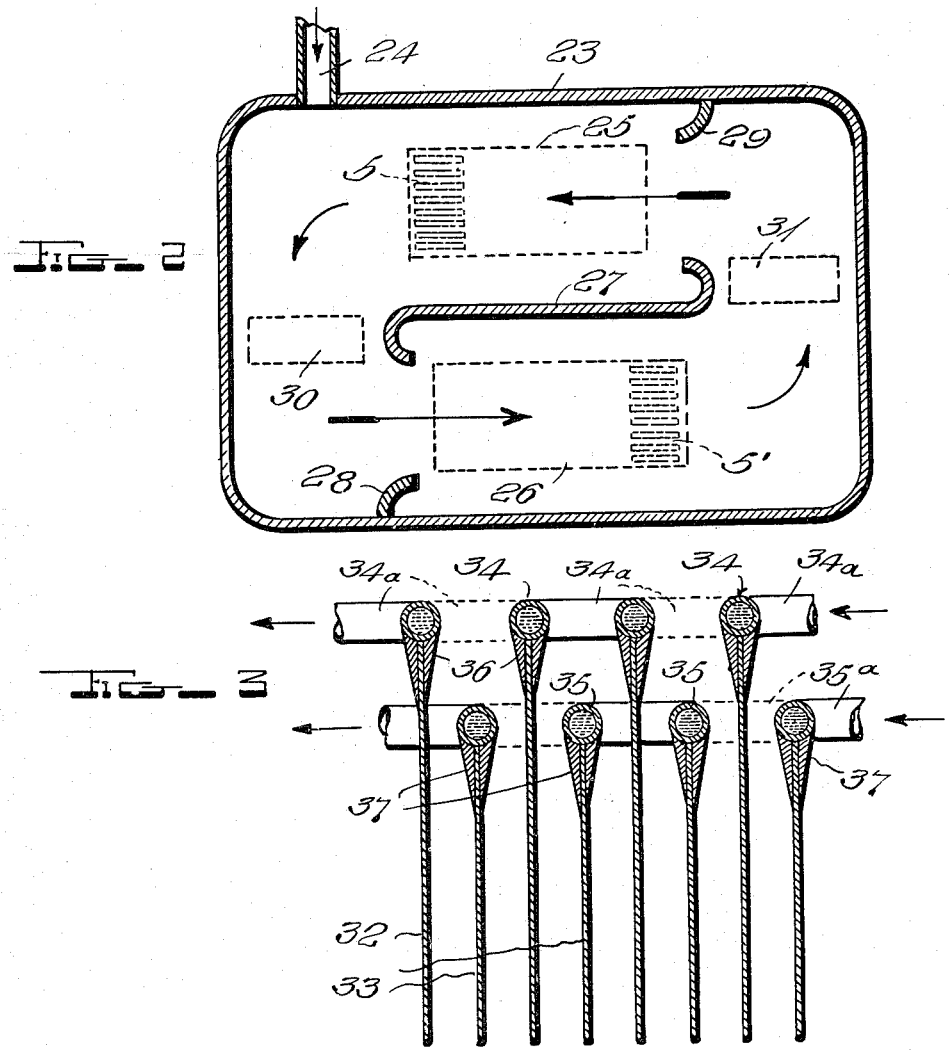
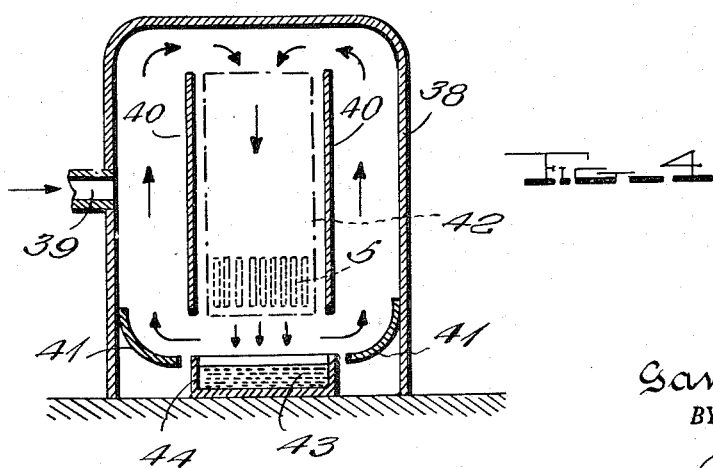
INVENTOR.
James Slayter,
BY John Q. Brady
ATTORNEY.

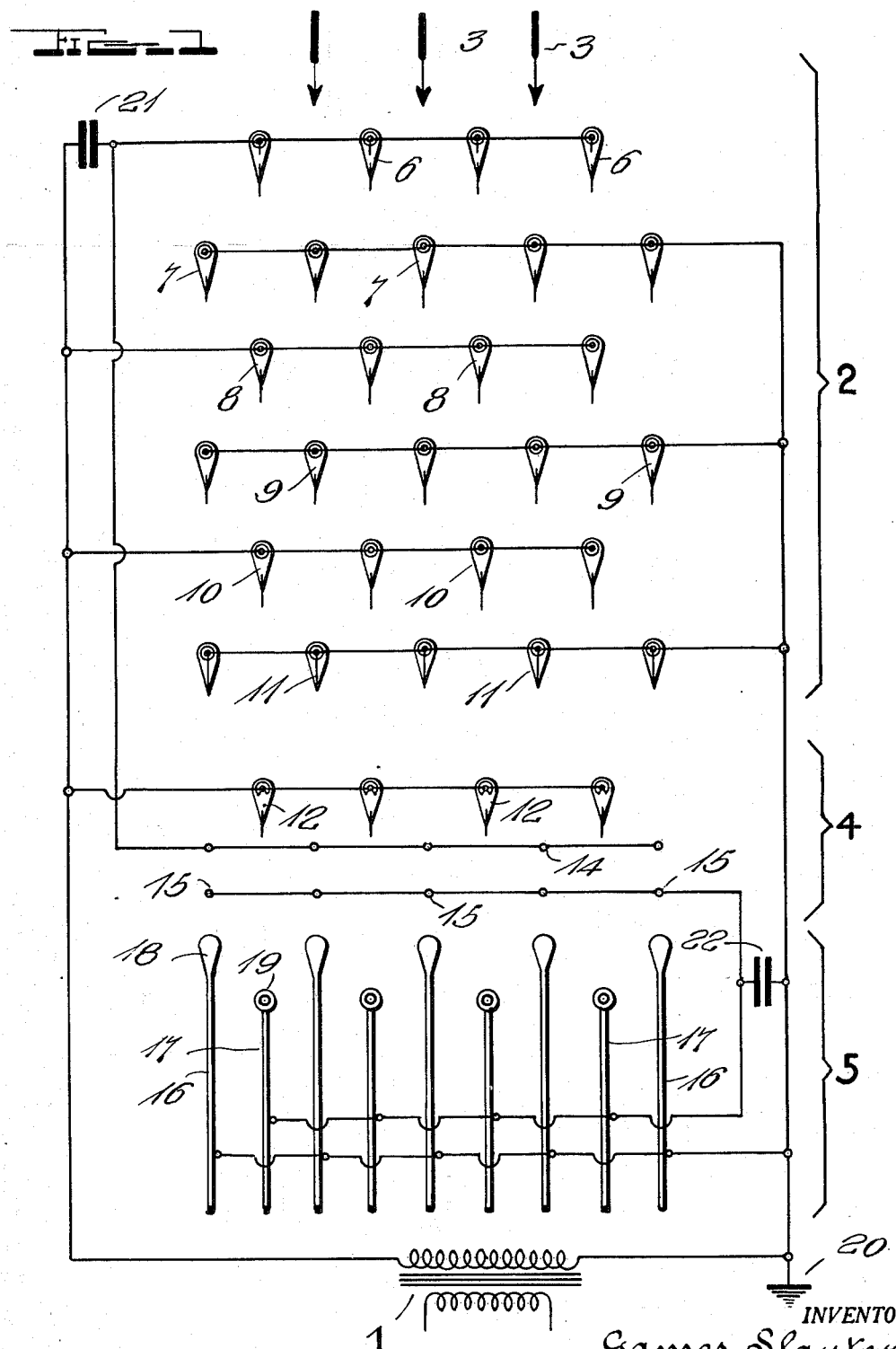

Patented Apr. 14, 1942

2,279,583

UNITED STATES PATENT OFFICE 2,279,583

CHEMICAL SYNTHESIS WITH ELECTRIC PRECIPITATION

Games Slayter, Newark, Ohio, assignor to Slayter Electronic Corporation, a corporation of Ohio Application April 6, 1939, Serial No. 266,436

5 Claims. (Cl. 204—312)

My invention relates broadly to chemical synthesis in the gaseous or vapor stage and more particularly to an electrode arrangement for facilitating the chemical reaction and producing electric precipitation of the products of reaction.

One of the objects of my invention is to provide an electrode arrangement in an electric discharge system operative in an atmosphere of reactant gases for producing chemical reaction therebetween under the influence of an electric discharge and for removing the product of reaction with the aid of electric precipitation so that the remaining gases may be recirculated through the discharge.

Another object of my invention is to provide electric discharge electrodes operative in an atmosphere of reactant gases for producing chemical reaction therebetween under the influence of an electric discharge, and electric precipitation electrodes in the path of the gases from said discharge electrodes effective to condition the gaseous products of reaction for removal from the system.

A further object of my invention is to provide an arrangement of electric discharge electrodes in an atmosphere of reactant gases for producing chemical reaction therebetween under the influence of an electric discharge and for creating movement of the gases and the products of reaction with respect to the discharge electrodes; and also to provide electric precipitation electrodes in line with the discharge electrodes for removing the electric charge from the products of reaction.

Still another object of my invention is to provide an arrangement of electric discharge electrodes and electric precipitation electrodes in an apparatus for chemical synthesis in the gaseous or vapor stage, with means for circulating reactant gases through the electrodes while continuously removing the products of reaction with the aid of electric precipitation.

A still further object of my invention is to provide an electrode arrangement in an electric discharge system for chemical synthesis in the gaseous or vapor stage, including a battery of electric discharge electrodes adapted to create a movement of the reactant gases and to promote the chemical reaction therebetween under the influence of electric discharge, a group of discharge and target electrodes connected as a rectifier for deriving operating potentials from an alternating current source of power, and a series of plate electrodes adapted to collect at the surface thereof the products of reaction.

Another object of my invention is to provide an arrangement of electric precipitation electrodes employed in an electric discharge system for chemical synthesis in the vapor stage, wherein the electrodes are provided with cooling means by which the vapor products of reaction may be condensed and removed as liquid from the system.

Other and further objects of my invention reside in the system and electrode arrangements hereinafter set forth in more detail with reference to the accompanying drawings, in which:

Figure 1 is a schematic diagram of the arrangement of the various electrodes in a preferred form of my invention, showing the electrical connections for supplying alternating current to the electrodes; Fig. 2 is a diagrammatic sketch of a discharge chamber for employing dual groups of electrodes in the arrangement illustrated in Fig. 1; Fig. 3 is a diagrammatic cross-sectional view of a number of electric precipitation electrodes provided with cooling means; and Fig. 4 is a diagrammatic sketch of a modified form of discharge chamber for employing a single group of electrodes in the arrangement of Fig. 1.

The use of electric discharges to promote chemical reaction in the gaseous or vapor state has its basis in the theory that under ionic bombardment, such as takes place in an electric discharge of the dark or silent type, molecular dissociation results in the reactive gases to an extent that the forces of chemical reaction may operate to better advantage. The electric discharge thus has a catalytic effect when produced in an atmosphere of reactant gases so that the products of reaction are more easily obtained. It is known that if such products, when in the gaseous or vapor stage are permitted to remain in or to circulate through the electric discharge, the further bombardment thereof will result in their being reduced to other, usually undesirable products. The removal of the products of the chemical reaction is effected in accordance with my invention by electric precipitation, by virtue of the charged character of the product of reaction due to the action of the electric discharge; and the means employed include collector plate elements energized at suitable potential and placed in the path of the gases subsequent to the action of the electric discharge, so that the charge borne by the gases is collected thereby and the neutral products of reaction may be subsequently and effectively withdrawn from the system by suitable means.

Referring to the drawings in more detail, Fig. 1 illustrates the electrode arrangement in a preferred form of my invention employing alternating current supplied through a transformer, indicated by reference character 1. The arrangement may be considered in three divisions as indicated by brackets to the side of Fig. 1. A division 2 comprises the discharge portion wherein the chemical reaction is effected and movement is imparted to the gases in the direction of the arrows 3. Next is a rectifier portion 4 by which direct current operating potentials for a precipitator portion are derived from the alternating current source. And lastly is the precipitator portion 5 wherein the gases are neutralized and the products of the reaction are prepared for removal from the system as will be further considered hereinafter.

The discharge portion 2 comprises a first bank of electrodes 6 characterized as of a leaky capacitive type, succeeding intermediate banks of electrodes 7, 8, 9 and 10 characterized as of a capacitive type, and a last bank of electrodes 11 of a leaky capacitive type. The electrodes 11 function only as target electrodes so that the region of the catalytic electric discharge is between the banks of electrodes 6 and 11, the chemical reaction being effected therein.

The physical motion imparted to the gases by the ionic bombardment in the field of the discharge carries the gases through the electrode arrangement and, in the form of apparatus shown in Fig. 2, produces circulatory currents for more complete chemical synthesis as the reactant gases are repeatedly subjected to the catalytic electric discharge. The portion 2 of the arrangement is constituted, therefore, as a blower for producing mass movement of the gases, and in general form is similar to the arrangement disclosed in a copending application of Willard H. Bennett, Serial No. 254,724, filed February 4, 1939, and assigned to the assignee of this case, for Electric discharge system wherein the mass movement of atmospheric air is the primary object of the invention. In the present application of similar structure, chemical synthesis as well as motion is produced in the portion 2, and the electrode arrangement therein is combined in a special manner with the subsequent rectifier and precipitation portions 4 and 5.

The rectifier portion 4, Fig. 1, comprises a bank of discharge electrodes 12 characterized as of a semi-conducting type, a series of rods 14 constituting a control arrangement, and a second series of rods 15 which serve as target electrodes. The principles of operation of a rectifier of this type are set forth in detail in my copending application Serial No. 190,308, filed February 12, 1938, for Method and apparatus for rectifying alternating current, and in a copending application of Willard H. Bennett, Serial No. 224,217, filed August 10, 1938, and assigned to the assignee of this case, for Rectification system. The extent of the discharge produced at the electrodes 12 is not sufficient to act on the products of the chemical synthesis in the portion 2 as the energy requirements of the precipitator are very small. The rectifier portion 4 may be relatively inefficient and still be adequate for the purposes of the arrangement herein disclosed, namely to supply static potential to the plates of the precipitator portion 5.

The ionized gases including the products of reaction, after passing the target electrodes 15 of the rectifier portion 4, enter passages between plate electrodes 16, 17, which are arranged in line with the direction of movement of the gases. The plates 16 form a bank electrically bounded together, and have streamlined metal target edges 18 projected beyond the edges of plates 17 against the current of the gases. Plates 17 are electrically bonded together and are provided with capacitive target electrodes somewhat withdrawn between the target edges 18 of the plates 16. This arrangement precludes the attraction of the charges unsymmetrically to the plates 17, which are positively charged from the rectifier target rods 15, as the capacitive targets 19 will become charged up to a static condition at which the attraction to targets 18 and 19 is equalized. The gases then will flow evenly between the plates 16 and 17, and by virtue of the charges on the respective plates the ionized gases are attracted thereto and molecularly precipitated thereon. The pressure from the forward portion 2 expells the neutralized gases from between the plates whereupon the products of the chemical synthesis may be removed in any desired manner, as by absorption, solution, condensation, or other effective procedure suited to the product. The remaining quantity of reactive gases may then be recirculated through the discharge and synthesis portion 2 of the electrode arrangement.

Referring still to Fig. 1, the electrical connections therein shown supply the various electrode banks with suitable operating potentials. One terminal of the secondary of transformer 1 is grounded at 20, which terminal is also connected with electrode banks 7, 9 and 11 in the discharge portion 2. Electrode banks 8 and 10 in the discharge portion are connected directly to the opposite terminal of the transformer secondary, but the first bank 6 is connected thereto through a condenser 21. The mode of operation of the arrangement at 2 as thus connected, including inherent rectification functions, is such as to build up a D. C. bias between the first and last banks, 6 and 11, which appears across condenser 21, and consequently the potential of the bank 6 swings with an alternating potential with respect to this D. C. bias potential difference from ground. This mode of operation is more fully detailed in the copending application Serial No. 254,724, of Willard H. Bennett, supra.

The rectifier portion 4 is connected in series with the plates 16, 17 across the secondary of transformer 1, with a condenser 22, shunting the plates 16, 17, and operating to smooth the rectified voltage. The control bank 14 of the rectifier 4 is connected with the first bank of discharge electrodes 6 and maintained by the D. C. potential on the electrodes 6 at a suitable bias potential with respect to the discharge electrodes 12 for regulating the operation of the rectifier; condenser 21 maintains the bias potential on the control bank 14 with respect to the discharge electrodes 12.

In Fig. 2, the wall of a reaction chamber is indicated at 23 with an inlet or inlets for reactive gases suitably arranged as at 24 and controlled by shut-off valves as may be desired. Within the chamber, one or more electrode arrangements shown in Fig. 1 are mounted, and baffles are provided for circulation of the gases. The form of my invention illustrated in Fig. 2 includes two such electrode arrangements in the relative positions indicated at 25 and 26, with the precipitator portions 5 and 5' in the locations shown. An intermediate baffle plate 27 and side baffles 28 and 29 are conveniently arranged to provide a smooth flow of gases in circulation in the directions indicated by arrows. Means for removing the products of reaction are preferably located in the positions indicated at 30 and 31, and may be of any suitable type as above mentioned.

The arrangement of the plate electrodes shown in Fig. 1, with the product extraction means located as indicated in Fig. 2, may be employed especially where the products of reaction are best removed by separate means. In some instances, such products may be easily condensed by cooling, and suitable condensation means provided at 30, 31, Fig. 2. Fig. 3 illustrates a modified form of precipitation plate wherein cooling means are embodied in the plate and thus vapor products of reaction may be condensed by the combined effect of electrical attraction of the charged vapor and the cooling afforded by the plates on which the vapor is precipitated.

The plate electrodes 32, 33, Fig. 3, are arranged similarly as the plates 16, 17, Fig. 1, but in lieu of the target provision shown in Fig. 1 the plates 32 and 33 are similarly edged by tubular members 34 and 35, respectively, supported by streamlining elements 36, 37. The tubular members 34 on plates 32 are joined at the ends by coupling portions 34a, and the tubular members 35 on plates 33 by similar coupling portions 35a, so that cooling fluid may be passed through the tubular members on the edges of the several plate electrodes, as indicated by arrows. Suitable liquid collecting and draining means (not shown) are arranged in cooperating relation to the precipitating and condensing plates 32, 33, by which the product of reaction is removed from the system.

Fig. 4 illustrates a modified form of reaction chamber especially adapted for the removal of the products of reaction by dissolution. The chamber wall 38 has an inlet 39 and contains baffle plates 40, and 41 for directing the gases in the directions indicated by arrows. An electrode arrangement such as shown in Fig. 1 is disposed vertically in the chamber in a central position indicated at 42 with the precipitation portion 5 in the relative location shown. In this position the gases are expelled downwardly on the surface of a solvent 43 contained in receptacle 44 and the soluble product of reaction is retained in solution while the remaining reactant gases pass over the baffles 41 and are recirculated.

While I have disclosed my invention in certain preferred embodiments, I desire it understood that various modifications in arrangement and application may be made thereof, and that no limitations upon my invention are intended except as are imposed by the scope of the appended claims.

What I claim as new and desire to secure by Letters Patent of the United States is as follows:

1. An electrical system for chemical synthesis comprising, in combination, electric discharge electrodes, alternating current means for energizing said electric discharge electrodes to produce a catalytic electric discharge in an atmosphere of reactant gases, whereby the products of reaction are rendered in a charged gaseous state; a voltage rectifier including electric discharge and target electrodes energized from said alternating current means and disposed in said atmosphere of reactant gases including the products of reaction; electric precipitation electrodes, and means including said voltage rectifier for energizing said electric precipitation electrodes, whereby said electric precipitation electrodes are operative to condition said charged products of reaction for conversion from the gaseous state.

2. An electrical system for chemical synthesis comprising, in combination, electric discharge electrodes, alternating current means for energizing said electric discharge electrodes to produce a catalytic electric discharge in an atmosphere of reactant gases and to initiate motion in said gases; a voltage rectifier energized from said alternating current means and disposed in the path of movement of said gases and comprising electric discharge and target electrodes operable in the atmosphere of said gases, including the products of reaction; electric precipitation electrodes arranged in the path of movement of the gases from said rectifier, and means including said rectifier for energizing said electric precipitation electrodes by a rectified voltage from said rectifier for conditioning the products of reaction for removal.

3. An electrical system for chemical synthesis comprising, in combination, a source of alternating current, electric discharge and target electrodes connected to opposite terminals of said source and cooperative to produce a catalytic electric discharge in an atmosphere of reactant gases; electric discharge and target electrodes constituting a voltage rectifier disposed in said atmosphere of reactant gases and connected with said source of alternating current, static control electrodes in said rectifier, a bias connection to said control electrodes from the first said discharge electrodes at a potential resulting from rectification in the operation of the first said discharge and target electrodes, and a condenser with a difference of potential equal to the bias voltage connected between the alternating current source at the connection to the second said discharge electrodes and said bias connection; electric precipitation electrodes comprising alternately connected sets of plate elements, and means including said source of alternating current and said voltage rectifier for energizing said sets of plate elements in opposite polarities whereby said electric precipitation electrodes are operative to condition the products of reaction of said gases for conversion from a gaseous state.

4. An electrical system for chemical synthesis comprising, in combination, means for producing a catalytic alternating current electric discharge, with an inherent partial rectification of current, in an atmosphere of reactant gases, means for producing a difference of potential proportional to said partial rectification of current, electric discharge rectification means controlled by said difference of potential and operative in said atmosphere of reactant gases including the products of reaction, and electrical precipitation electrodes energized from said rectification means in fixed opposite polarities and effective in the removal of said products of reaction from the system.

5. An electrical system for chemical synthesis comprising, in combination, means for producing a catalytic alternating current electric discharge, accompanied by a partial rectification of current, in an atmosphere of reactant gases and operative to initiate motion in said gases, means for producing a difference of potential proportional to said partial rectification of current, electrical precipitation electrodes disposed in the path of movement of said gases and the products of reaction thereof, and means for maintaining said electrodes charged in opposite polarities under the influence of said difference of potential, said electrodes being effective in the removal of said products of reaction from the system.

GAMES SLAYTER.